3,792,007
FLAME RETARDANT LATEX
Edward H. Gleason and Leonard F. Guziak, Monroeville, Pa. (both % Koppers Company, Inc., Koppers Bldg., Pittsburgh, Pa. 15219)
No Drawing. Continuation-in-part of abandoned application Ser. No. 26,419, Apr. 3, 1970. This application Nov. 15, 1971, Ser. No. 198,970
Int. Cl. C08d 7/10; C09d 5/18
US. Cl. 260—29.7 P    4 Claims

ABSTRACT OF THE DISCLOSURE

A self-extinguishing polymer composition in latex form has been prepared by the adding from 1 to 10 parts by weight of tris(2,3-dibromopropyl) phosphate in combination with a synergistic amount (0.5 to 3.0 parts by weight) of a salt selected from the group consisting of monoammonium phosphate, diammonium phosphate and triammonium phosphate, to a terpolymer comprising 20–70 parts by weight of an aryl vinyl monomer and 30–80 parts by weight of a conjugated diolefin, and 0.5–10 parts by weight of an $\alpha,\beta$-ethylenically unsatuarted carboxylic acid. If desired, a portion of the ammonium salt may be added to the latex during polymerization as well as after the polymerization.

CROSS REFERENCES TO RELATED APPLICATIONS

This application is a continuation in part of our co-pending application Ser. No. 26,419, filed Apr. 3, 1970, and now abandoned.

BACKGROUND OF THE INVENTION

It is known to add halogenated phosphate esters to styrene polymers and copolymers of styrene with substituted styrenes or acrylates to impart self-extinguishing properties to the mixture. Thus, U.S. 3,001,954 relates to the addition of tris(2,3-dibromopropyl) phosphate to styrene monomer or to a mixture of styrene and another monomer such as an acrylic ester to form self-extingiushing, expandable polymer.

It is also known that latexes containing styrene and butadiene are usable as backsizing for textile carpets. For this purpose it is possible to include a carboxylic acid comonomer to add to the bond strength of the latex to the carpet material.

Latex itself, because of the large amount of water in the material is not too prone to burn. However, when the latex is applied, as for example to a carpet material, and the water has evaporated or been dried off, the resulting film of polymer is especially prone to burning due to the thin cross section of the product.

The demand for self-extinguishing, or fire retardant carpet as for example to meet Federal specifications for use in public buildings, has created a problem of how to effectively cope with the matter of flameproofing materials having high surface to volume ratio.

SUMMARY OF THE INVENTION

It has been found that copolymers of aryl vinyl monomers and conjugated diolefins in combination with minor amounts of ethylenically unsaturated carboxylic acid compounds or their amides, can be rendered fire-retardant by the addition of from about 1 to about 10 parts by weight based on monomers of tris(2,3-dibromopropyl) phosphate and a synergistic amount (from about 0.5 to about 8 parts by weight based on monomers) of a salt selected from the group consisting of monoammonium phosphate, diammonium phosphate, and triammonium phosphate. The additives may be added to the monomers prior to emulsion polymerization to form a latex or the additives may be added to the already-formed latex. The latexes containing the mixture of bromopropyl phosphate and ammonium phosphate are useful as backsizing for textile carpets and render the carpet fire-retardant.

DETAILED DESCRIPTION

The aryl vinyl monomers suitable for use in the present invention are styrene, substituted styrene such as methyl styrene, dimethyl styrene, ethylstyrene, chlorostyrene, 2,4-dichlorostyrene, 2,5-dichlorostyrene, and divinyl benzene, $\alpha$-methylstyrene, $\alpha$-methyl-p-methylstyrene, vinylnaphthalene, and the like, or mixtures of these compounds.

Examples of conjugated diolefins which may be used are 1,3-butadiene, 2,3-dimethylbutadiene, 2-methyl-butadiene-1,3 (isoprene), 2 - chlorobutadiene - 1,3 (chloroprene), piperylene and the like.

Ethylenically unsaturated carboxylic acid compounds usable include the monocarboxylic acids such as acrylic acid, methacrylic acid, ethacrylic acid, and crotonic acid and the dicarboxylic acids such as itaconic aid, methyl itaconic acid, maleic acid, fumaric acid, mesaconic acid, citraconic acid and the like, as well as mixtures of these.

Ethylenically unsaturated primary amides usable in the present invention would include acrylamide, methacrylamide, ethacrylamide, crotonamide, itaconamide, methyl itaconamide, maleic acid monoamide, diacetone acrylamide and the like.

These components are emulsion polymerized to form the polymers of the present invention.

In normal emulsion polymerizations, a minor amount of an inorganic salt of electrolyte is required. Normally preferred inorgnaic salts are the chlorides, sulfates, bisulfites, or phosphates of the alkali metals, or alkaline earth metals, such as potassium chloride, trisodium phosphate, tetrasodium phosphate, sodium hexametaphosphate and sodium chloride. It has now been found that all or part of the ammonium phosphate salt to be added as synergist for flame-retardancy can be used to replace all or part of the alkali metal salt in the polymerization recipe. Less than 0.50 part by weight based on monomers of the phosphate does not afford fire retardancy, while greater than about 8 parts by weight of the phosphate causes instability in the latex. The preferred amounts of ammonium phosphate for the present invention are between about 0.50 and about 3.0 parts by weight based on monomer. A portion of the phosphate may be used in the polymerization recipe and a remaining portion added to the latex after polymerization is complete.

Latexes especially suitable for the post addition of the tris(2,3 - dibromopropyl)phosphate and the ammonium phosphate additives are latexes prepared by the processes described in U.S. 3,487,032 by Guziak et al. and U.S. 3,484,395 by Guziak.

The use of organic surface-active agents are surfactants is also important, and the amount can vary from about 2 to 4 parts per 100 parts of monomer. These organic surfactants enable the formation of a colloidal solution for polymerization. Various surfactants are usable, such as the alkyl aryl sulfonates, organo phosphate esters, sulfated esters of fatty acids, sodium dodecyl diphenyl-ether disulfonates, dialkyl esters of succinic acid and other water soluble anionic surfactants. Also, nonionic surfactants are usable such as the alkyl phenyl polyethoxy ethanols, organo silicones, fluorocarbon surfactants and the like. Also, mixtures of various well-known surfactants are usable and could be chosen by one versed in the art of emulsion polymerization.

In addition to the inorganic salts and organic surfactants, there may also be used, in the polymerization, a chelating agent such as a tetrasodium salt of ethylene-diamine tetracetate. These chelating agents are known in the art for use in emulsion polymerization and are generally used in an amount of about 0.01 to 1.0 part per 100 parts monomer.

The tris(2,3-dibromopropyl) phosphate may be added to the monomer prior to suspension in water in amounts varying from about 1 to about 10 parts per 100 parts of monomer. Preferred amounts are between 1.25 and 5.0 parts per 100 parts of monomer. The addition of the bromo-compound prior to polymerization assures a homogeneous mixing of the compound into the latex. Lesser amounts of the bromo-compound do not furnish sufficient fire-retardancy, while when greater than about 10 parts bromo-compound are used the bromo-compound becomes slightly incompatible with the latex, which results in lack of coalescence within the film.

The polymerization catalyst or initiator used to produce the novel latex of the present invention is chosen from the many which serve as a thermally activated source of free radicals, such as the organic peroxides, perbenzoates and persulfates. Preferably, ammonium persulfate is used, as it provides efficient reaction rates and contains a fugitive cation and allows the retention of the amount of electrolytes at a low level. The amount of catalyst used is normally about 0.1 to 2.0 parts per 100 parts of monomer, preferably about 0.25 to 0.50 part.

Chain transfer agents may be used in the present inventions to regulate the average molecular weight of the polymer to a usable range. Those preferably used are the long chain alkyl mercaptans such as t-dodecylmercaptan or tridecyl mercaptans. Other useful chain-transfer agents may be used such as the lower alkyl xanthogens, alpha-bromoethylbenzene, alpha-chloroethylbenzene and carbon tetrabromide. The amount of chain transfer agent varies according to the activity of the particular agent and is readily determined by one skilled in the art.

The polymerization is carried out in aqueous acidic emulsion, the amount of water being varied according to the solids content desired in the final latex. Generally preferred is a ratio of water to monomer such that a latex having a total solids content, i.e. copolymer surfactants and electrolytes, of from about 40–65 percent is produced. The preferred range of solids is from 48–55 percent.

The polymerization is carried out at a temperature conventionally used in polymerization, such as between 50 and 100° C., preferably at a temperature of 70–80° C.

Upon completion of the polymerization, the pH of the latex is adjusted to 8–10, preferably about 9.0, with inorganic or organic bases such as sodium hydroxide, ammonium hydroxide, potassium hydroxide, morpholine, water soluble amines, hydroxylamines, and the like; ammonium hydroxide preferably being used.

Methods of measuring the burning of flammability characteristics of styrene-butadiene latex films or coatings have not been highly developed. Various correlations have been attempted between the rates of burning of film strips supported at various angles—horizontally, at 45° incline, and vertically.

Recently, notice of a proposed flammability standard was published by the U.S. Department of Commerce, entitled "Interim Federal Specification DDD-C-001173 (GSA-FSS), Carpet, Nonwoven, Polypropylene, Outdoor-Indoor Type."

This method covers the procedure for measuring flammability. The test shall be carried out in a suitably sized chamber or box which is open at the top to provide adequate ventilation and which, at the same time, protects the specimen and the ignition flame from drafts. The box should be 12 inches by 12 inches by 9 inches. The ignition media shall be Methenamine Timed Burning Tablet (Eli Lilly No. 1588). The measuring device shall be a scale graduate in inches and tenths of inches. Two test specimens, each 6 inches square, shall be cut from the fabric to be tested. The test shall be done using 30 percent relative humidity. This condition is to be arrived at by using a small laboratory drying oven in conjunction with the standard conditioned testing room. From the psychrometric chart, it can be determined that air at 70° F. and 65 percent relative humidity will have a relative humidity of 30 percent when heated to 94° F. Set the oven controls to maintain this latter temperature, place the samples in the oven and allow them to come to equilibrium. Without disturbing the configuration of the surface fibers, the sample shall then be laid out in the test chamber smoothly, horizontally and with tension. A burning tablet shall then be placed firmly in the center of the sample and ignited by touching a match carefully to the edge of the tablet so as not to contact the surface of the carpet. The ignition flame and any propagated flame shall be allowed to burn to completion. The longest diameter of the charred area shall be measured to the nearest tenth of an inch. If the charred area is greater than 2 inches in diameter, the sample is considered non-flame retardant.

The invention is further illustrated by, but is not intended to be restricted to, the following examples wherein all parts specified are parts by weight based on total monomer composition.

EXAMPLE I

There were charged to each of a series of crown capped bottles 100 parts of water, 49 parts of styrene conveniently containing the amounts of tris(2,3-dibromopropyl) phosphate shown in Table I, 46.0 parts of butadiene, 3.0 parts acrylamide, 2.0 parts itaconic acid, 0.15 part of the catalyst potassium persulfate, 3.0 parts surfactant comprising 1.0 part of a sodium salt of dodecylbenzene sulfonate and 2.0 parts of an octylphenoxypolyethoxyethanol containing about five oxyethylene units, and 0.20 part of potassium chloride as electrolyte. The bottles were placed in a water bath, agitated, heated to 65° C. and held at 65° C. for 4 hours. The bath temperature was then increased to 70° C. and held at that temperature for an additional 8 hours until about 50% solids were present in the reaction mixtures. The latexes were then cooled, removed from the bottles, and placed in a stripper where they were neutralized with aqueous ammonia. The properties of the resulting latexes are shown in Table I. All latexes were cast into films of between 15 and 20 mils thickness and tested for fire-retardancy by holding the films horizontally, igniting the ends of the films, and observing whether the flame extinguished itself after removal of the ignition source. All films burned readily with no self-extinguishing occurring despite the presence of the brominated phosphate, which is a known fire retardant for polymers samples having a thicker cross section.

TABLE I

| Run number | 1 | 2 | 3 | 4 | 5 | 6 |
|---|---|---|---|---|---|---|
| Bromopropyl phosphate (parts) | 0 | 1 | 2 | 3 | 4 | 5 |
| Conversion rate (percent/hr.) | 12 | 11 | 17 | 16 | 15 | 16 |
| pH adjusted (NH$_4$H) | 8.5 | 8.7 | 9.0 | 8.5 | 8.6 | 8.9 |
| Viscosity (cps. 30 r.p.m.) | 550 | 320 | 710 | 540 | 530 | 530 |
| Surface tension (dynes/cm.) | 40 | 41 | 44 | 39 | 39 | 39 |

It should be noted that the conversion rate was not retarded by the addition of the bromopropyl phosphate although alkyl bromides are known chain terminator agents.

EXAMPLE II

Latexes were prepared by the method described in Example I except that 5.0 parts tris(2,3-dibromopropyl) phosphate was added and the electrolyte, potassium chloride, was replaced by the amounts of monoammonium phosphate as indicated in Table II. The properties of the resulting latexes are shown in Table II.

TABLE II

| Run number | 1 | 2 |
|---|---|---|
| NH$_4$H$_2$PO$_4$ added (parts) | 0.50 | 0.55 |
| Conversion rate (percent/hr.) | 11 | 10 |
| pH adjusted (NH$_4$OH) | 8.4 | 8.8 |
| Viscosity (cps. 30 r.p.m.) | 250 | 200 |
| Surface tension (dynes/cm.) | 36 | 35 |
| Film fire retardancy (15–20 mils) | S.E. | S.E. |

NOTE.—S. E. is self-extinguishing.

The addition of 1 part of monoammonium phosphate to the latex of run 2 after polymerization was complete gave a latex whose film extinguished even more rapidly than that from run 2 without post addition of additional phosphate. This shows that the addition of the ammonium phosphate to the bromopropyl phosphate gave fire retardancy to the resulting films, whether added during or after the polymerization.

EXAMPLE III

A series of polymerizations was run to determine the effect of the amount of bromopropyl phosphate required to give fire-retardancy to a styrene-butadiene based latex. To a polymerization reactor, there was charged an aqueous solution containing 43.16 parts of water, 0.30 part of sodium salt of dodecylbenzene sulfonate, 0.06 part of an octylphenoxypolyethoxyethanol containing about five oxyethylene units, 0.05 part of the tetrasodium salt of ethylenediamine tetraacetate, 0.0275 part of potassium chloride, 0.50 part of acrylamide, and 1.5 parts of itaconic acid. The solution was agitated and warmed to 50° C. and a catalyst solution of 0.30 part of ammonium persulfate in 6.07 parts of water added followed by the oily phase solution containing 21.28 parts of styrene, 16.72 parts of 1,3-butadiene and the amounts of tris(2,3-dibromopropyl) phosphate indicated in Table III as flame retarder. The reaction mixture was agitated, heated to 72° C. and held at about 72° C. until 20% solids had been formed in the mixture (about 1.75 hours). There was then added in two streams, at a uniform rate during a period of 330 minutes, a first stream comprising an aqueous solution of 32.29 parts water, 0.30 part sodium salt of dodecylbenzene, 0.31 part of acrylamide and 0.93 part of itaconic acid and a second stream comprising an oily phase containing 34.72 parts of styrene, and 27.28 parts 1,3-butadiene. Following completion of the additions, the temperature was gradually raised to 80° C. and held at 80° C. until about 50% solids were present in the reaction mixture. The total reaction time was 11.75 hours. The latex was removed and placed in a stripper where it was neutralized with aqueous ammonia. Then 0.25% part sodium hexametaphosphate, 0.5 part monoammonium phosphate, 0.5 part of a polymeric hindered phenol antioxidant (Wingstay L) and 0.5 part aminomethyl propanol were added and volatiles removed to a monomer content of 0.03% during which time the pH of the latex dropped. Aqueous ammonia was added to give a pH of 9.0 and the mixture filtered to give the latex product (50% solids).

Each of the series of latexes was sprayed on a 6 inch by 12 inch piece of gold, needle punch, indoor-outdoor carpet at a coat weight of 9 ounces per square yard (dry weight). The carpet was placed in a 270° F. oven for 10 minutes, removed, cut into two sections (6" x 6"), and placed in a desiccator. The sections were tested for flame retardance by Interim Federal Specification DDD–C–001173 (GSA–FSS), for Carpet, Nonwoven, Polypropylene, Outdoor-Indoor Type, described earlier. Results are shown in Table III.

TABLE III

| Run number | 1 | 2 | 3 | 4 |
|---|---|---|---|---|
| Bromopropyl phosphate (parts) | 0.5 | 1.25 | 2.50 | 5.0 |
| Flame retardance (inches burned) | a>2 | 1¹/₁₆ | 1³/₁₆ | ⅝ | a Post-treatment with 0.5 additional parts $NH_4H_2PO_4$ gave values of flame retardance of >2 for Run No. 1 and ⅞ inches for Run No. 2.

These results indicate that the bromopropyl phosphate is an effective fire retardant is carpet backsizing when used in concentrations as low as 1.25 parts by weight per 100 parts monomer when accompanied by 0.5 part by weight of ammonium phosphate. The retardancy is enhanced by the addition of additional monoammonium phosphate after polymerization is completed. Less than 1.25 parts of the bromo ester gave a product which burns too readily, as in run 1. Greater than about 10 parts of the bromo ester gave latexes which tended to lack coalescence within the film.

EXAMPLE IV

A latex was prepared using the method of Example I except that 5.0 parts tris(2,3-dibromopropyl) phosphate was added. After polymerization was complete and the latex cooled, 4 to 8 parts of diammonium phosphate were added to portions of the latex. A test procedure was adopted whereby cotton cloth saturated at 0.30 g./sq. in. solids was dried and cut to provide test samples of one inch width. Each was ignited with a flame while supported vertically to permit burning from the top of the sample. The sample that had been saturated with latex containing 4 parts diammonium phosphate burned completely. However, the samples saturated with latex containing 6 and 8 parts, respectively, of the diammonium phosphate were self-extinguishing. All three samples had acceptable fire-retardancy when tested by the burning pill (Federal Specification DDD–C–001173 GSA–FSS) test.

EXAMPLE V

A latex was prepared by the method of Example I except that 5.0 parts tris(2,3-dibromopropyl) phosphate was added, the acrylamide was omitted from the recipe, and the potassium chloride replaced by monoammonium phosphate. Films of 15 to 20 mil thickness cast from this latex were self-extinguishing when tested by the horizontal burning test described in Example I.

EXAMPLE VI

Latexes were prepared by the method of Example I except that 5.0 parts (tris(2,3-dibromopropyl) phosphate was added, the itaconic acid was replaced by either acrylic acid or methacrylic acid, and the potassium chloride was replaced by monoammonium phosphate. Again, the cast films from these latexes were self-extinguishing.

EXAMPLE VII

In order to further illustrate the synergistic effect of the combination of the tris(2,3-dibromopropyl) phosphate and the ammonium phosphate on the fire-retardancy of the composition, the following experiments were carried out using post addition of the combination. To aliquot portions of a latex comprising 50 percent solids consisting of a tetrapolymer of 49 percent by weight styrene, 46 percent by weight butadiene, 2 percent by weight itaconic acid and 3 percent by weight acrylamide was added the amounts of the various additives shown in Table IV. In runs 1 through 4, each latex with its additives was then cast onto glass plates to form a film of from 2 to 4 mils thickness and dried in air. The films were stripped off the glass, supported on a wire ring and ignited by a flame at one edge. The results are shown in Table IV. For runs 5 through 7 each latex was placed in a small aluminum weighing dish, dried to form films of approximately 15–20 mil thickness and tested for fire-retardancy by holding the films horizontally, igniting the ends of the films, and observing whether the flame extinguished itself after removal of the ignition source. The results are shown in Table IV, also.

TABLE IV

| Run number | Film thickness, mils | Dibromopropyl phosphate, p.h.p.[1] | Diammonium phosphate, p.h.p.[1] | Film fire-retardancy [2] |
|---|---|---|---|---|
| 1 | 2–4 | 8 |  | Burns. |
| 2 | 2–4 | 10 |  | S.E. |
| 3 | 2–4 |  | 12 | Burns. |
| 4 | 2–4 | 5 | 1 | S.E. |
| 5 | 15–20 | 8 |  | Burns. |
| 6 | 15–20 |  | 12 | Do. |
| 7 | 15–20 | 5 | 2.5 | S.E. |

[1] P.h.p. is parts per hundred parts polymer solids.
[2] S.E. is self-extinguishing.

It can be seen from the Table IV that although 8 parts of the dibromopropyl phosphate alone does not render the tetrapolymer self-extinguishing and 12 parts of the diammonium phosphate alone does not render the tetrapolymer self-extinguishing, a combination of 5 parts of dibromo-compound with 1 or 2.5 parts of ammonium compound did render the tetrapolymer self-extinguishing. The effect of the combination is thus seen to be truly synergistic and not merely an additive effect of two known self-extinguishing agents.

EXAMPLE VIII

Experiments similar to those of Example VII were run using aliquot portions of a latex comprising 50 percent solids consisting of a terpolymer of 60 percent by weight styrene, 39 percent by weight butadiene, and 1.0 percent by weight of acrylic acid. The portions were cast into films 15–20 mils thick and dried in air. The results of the horizontal flame test as described in Example VII are shown in Table V.

TABLE V

| Run number | Film thickness, mils | Dibromopropylphosphate, p.h.p.[1] | Diammonium phosphate, p.h.p.[1] | Film fire-retardancy[2] |
|---|---|---|---|---|
| 1 | 15–20 | 8 | | Burns. |
| 2 | 15–20 | | 8 | Do. |
| 3 | 15–20 | 5 | 2.5 | S.E. |

[1] P.h.p. is parts per hundred parts polymer solids.
[2] S.E. is self-extinguishing.

The results again illustrate that the combination of dibromo-compound with the diammonium compound has a synergistic effect rather than merely an additive effect.

It will be recognized by those skilled in the art that the amounts of the constituents added may be affected by the particular ammonium compound selected, the thickness of the film to be tested, and the empirical nature of the particular flame-retardancy test to be utilized.

What is claimed is:

1. A self-extinguishing polymer composition in latex form comprising:
   (a) 100 parts by weight of a terpolymer consisting essentially of
      (i) 20–70 parts by weight of an aryl vinyl monomer, with correspondingly
      (ii) 30–80 parts by weight of a conjugated diolefin; and
      (iii) 0.5–10 parts by weight of an α,β-ethylenically unsaturated carboxylic acid;
   (b) 5.0 parts by weight of tris(2,3-dibromopropyl) phosphate; and
   (c) 1.0 to 2.5 parts by weight of diammonium phosphate.

2. The composition of claim 1 wherein the aryl vinyl monomer is styrene, the conjugated diolefin is butadiene, and the α,β-ethylenically unsaturated carboxylic acid is itaconic acid.

3. A self-extinguishing polymer composition in latex form comprising:
   (a) 100 parts by weight of a tetrapolymer consisting essentially of
      (i) 20–70 parts by weight of an aryl vinyl monomer, with correspondingly
      (ii) 30–80 parts by weight of a conjugated diolefin;
      (iii) 0.5–10 parts by weight of an ethylenically unsaturated carboxylic acid; and
      (iiii) 0.1–5 parts by weight of an ethylenically unsaturated primary amide;
   (b) 5.0 parts by weight of tris(2,3-dibromopropyl) phosphate; and
   (c) 1.0–2.5 parts by weight of diammonium phosphate.

4. The composition of claim 3 wherein the aryl vinyl monomer is styrene, the conjugated diolefin is butadiene, the ethylenically unsaturated carboxylic acid is itaconic acid, and the ethylenically unsaturated primary amide is acrylamide.

References Cited

UNITED STATES PATENTS

| | | | |
|---|---|---|---|
| 3,085,029 | 4/1963 | Miles et al. | 106—15 FP |
| 2,357,725 | 9/1944 | Bennett | 260—32 |
| 2,956,037 | 10/1960 | Venable | 260—30.6 |
| 3,445,404 | 5/1969 | Ronden et al. | 260—2.5 |

OTHER REFERENCES

Martens: Tech. of Paints, Varnishes, and Lacquers, pp. 202, 203, Reinhold (1968).

Ency. of Poly. Sci. and Tech., 7, pp. 18, 47 (1967).

THEODORE MORRIS, Primary Examiner

T. DE BENEDKTIS, Sr., Assistant Examiner

U.S. Cl. X.R.

106—15 FP; 260—29.7 N, 29.7 T, Dig. 24

PO-1050
(5/69)

UNITED STATES PATENT OFFICE
CERTIFICATE OF CORRECTION

Patent No. 3,792,007            Dated    February 12, 1974

Inventor(s)   Edward H. Gleason and Leonard F. Guziak

It is certified that error appears in the above-identified patent and that said Letters Patent are hereby corrected as shown below:

The assignee should be shown as "assignors to Sinclair-Koppers Company, a partnership of Delaware--.

Signed and sealed this 17th day of September 1974.

(SEAL)
Attest:

McCOY M. GIBSON, JR.
Attesting Officer

C. MARSHALL DANN
Commissioner of Patents